United States Patent [19]

Cannon et al.

[11] 4,147,896

[45] Apr. 3, 1979

[54] FIXED SPEECH BUFFER MEMORIES FOR SIGNALLING WITHOUT AN ORDER WIRE

[75] Inventors: Thomas B. Cannon, Denver; John F. O'Neill, Boulder, both of Colo.

[73] Assignee: Storage Technology Corporation, Louisville, Colo.

[21] Appl. No.: 863,890

[22] Filed: Dec. 23, 1977

[51] Int. Cl.² ............................................... H04J 5/00
[52] U.S. Cl. ................................................... 179/15 AS
[58] Field of Search .......... 179/15 AS, 15 A, 15 BW, 179/15 BA, 15 BV, 15 AP, 15 BY, 1 SA

[56] References Cited

U.S. PATENT DOCUMENTS

| 3,644,680 | 2/1972 | Amano et al. | 179/15 AS |
| 3,836,719 | 9/1974 | Clark | 179/15 AS |
| 4,012,595 | 3/1977 | Ota | 179/15 AS |
| 4,048,447 | 9/1977 | Maruta | 179/15 AS |

Primary Examiner—Thomas A. Robinson
Attorney, Agent, or Firm—Woodcock, Washburn, Kurtz & Mackiewicz

[57] ABSTRACT

In a time assignment speech interpolation system, a fixed delay between the input speech channel and the transmission facility provides time to generate and transmit a symbol representing the speech channel to which the transmission facility has been assigned. At the remote location, a fixed delay between the transmission facility and the output speech channel provides time in which to detect the symbol and perform the necessary switching.

7 Claims, 12 Drawing Figures

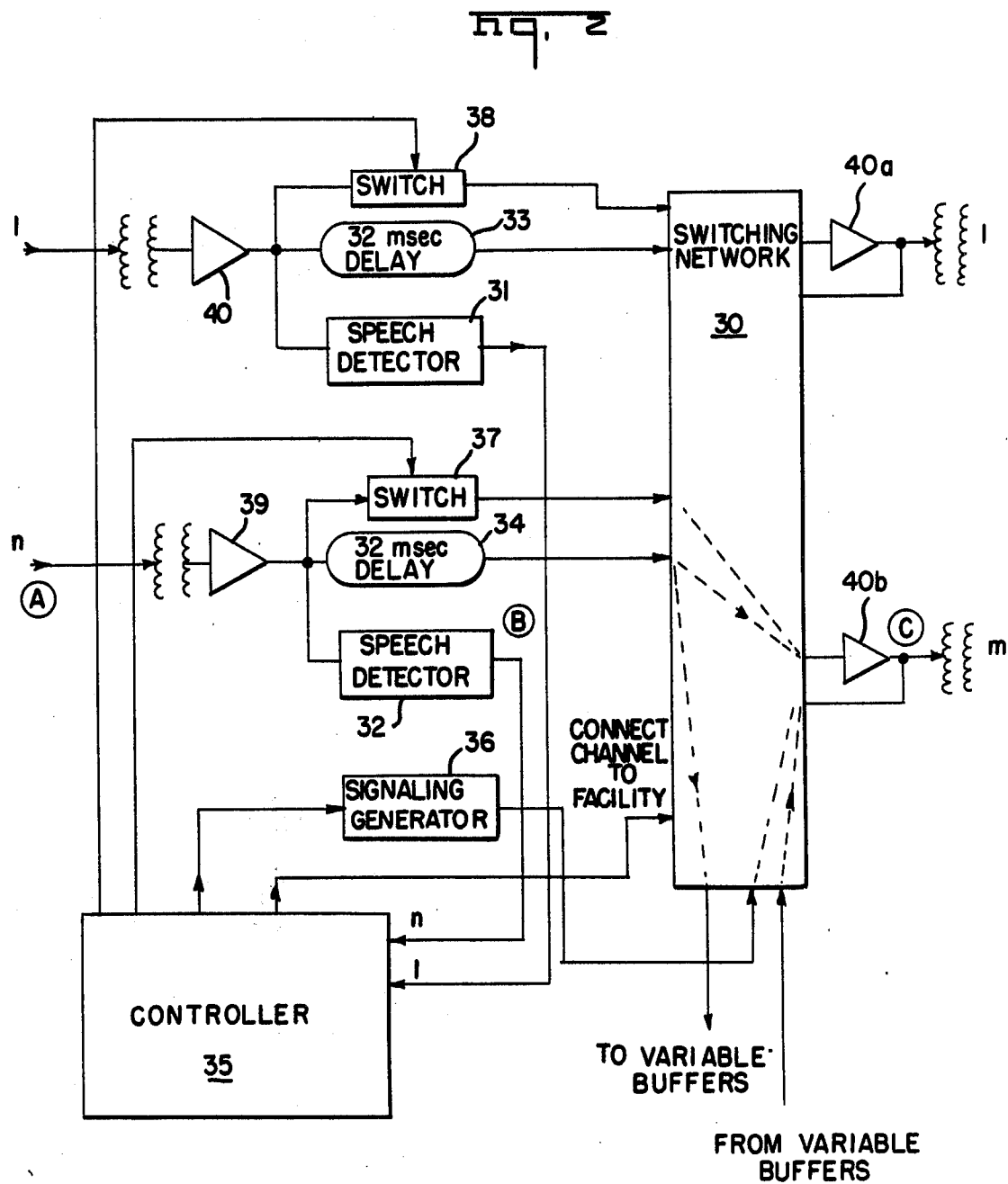

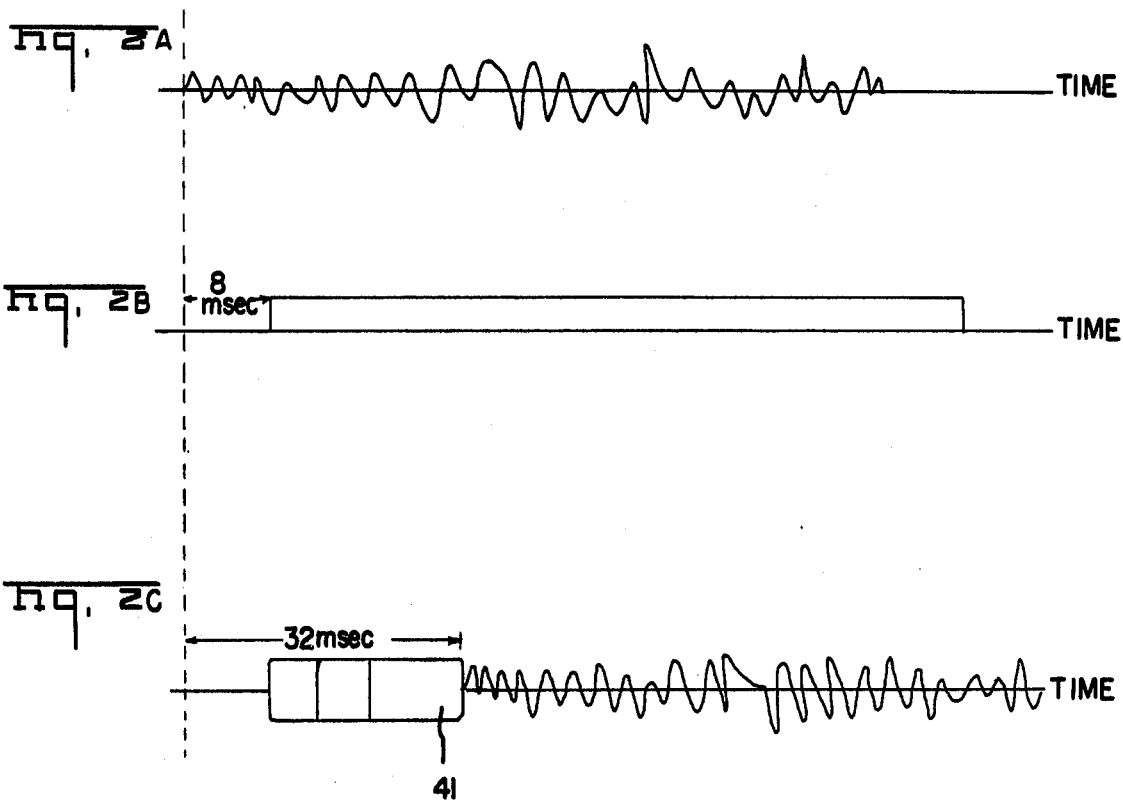

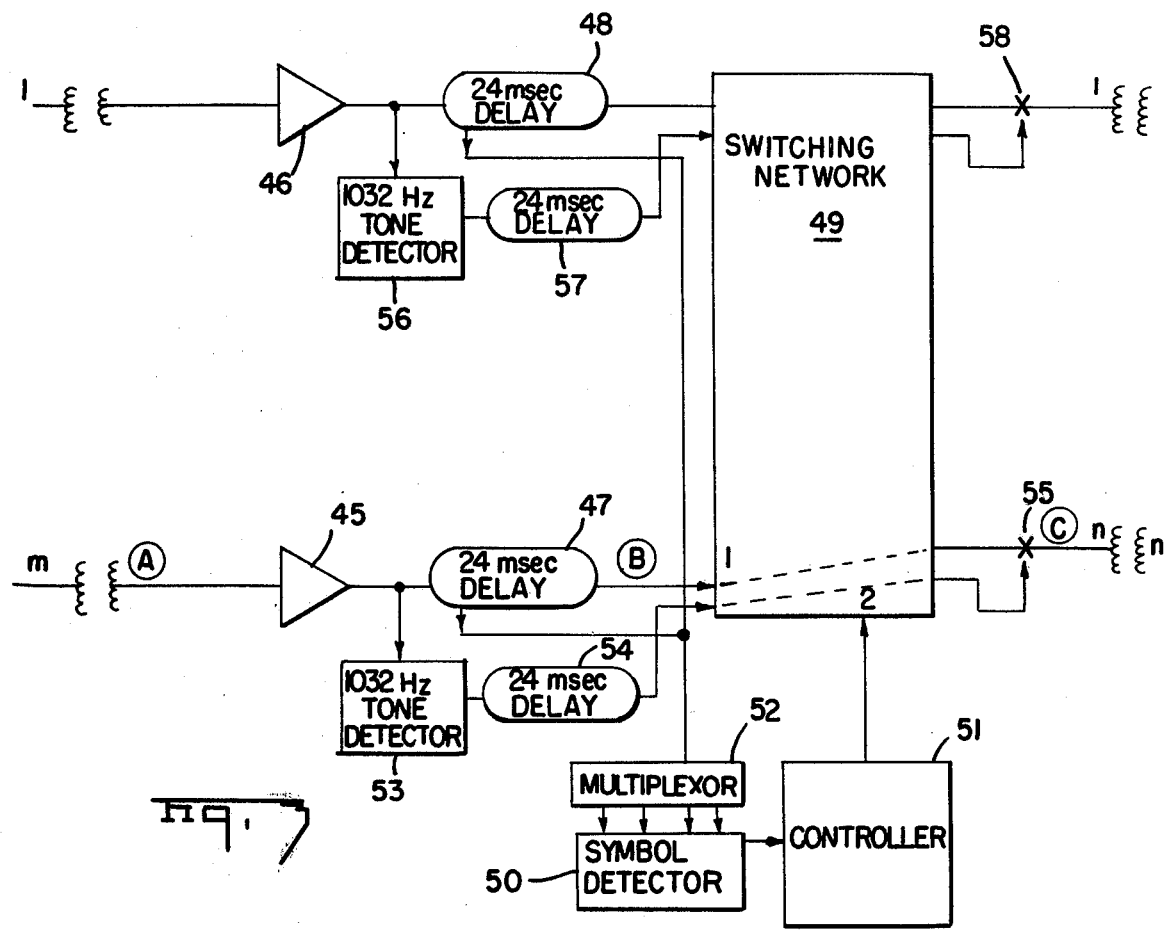
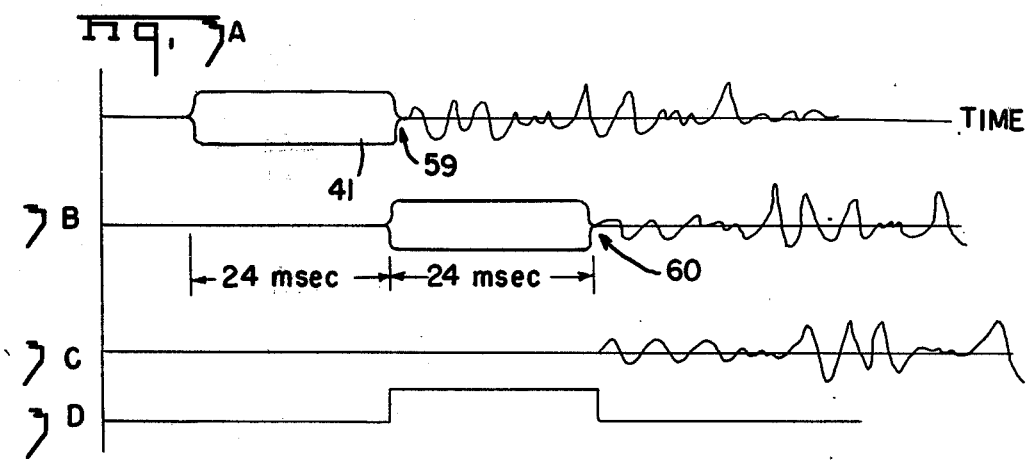

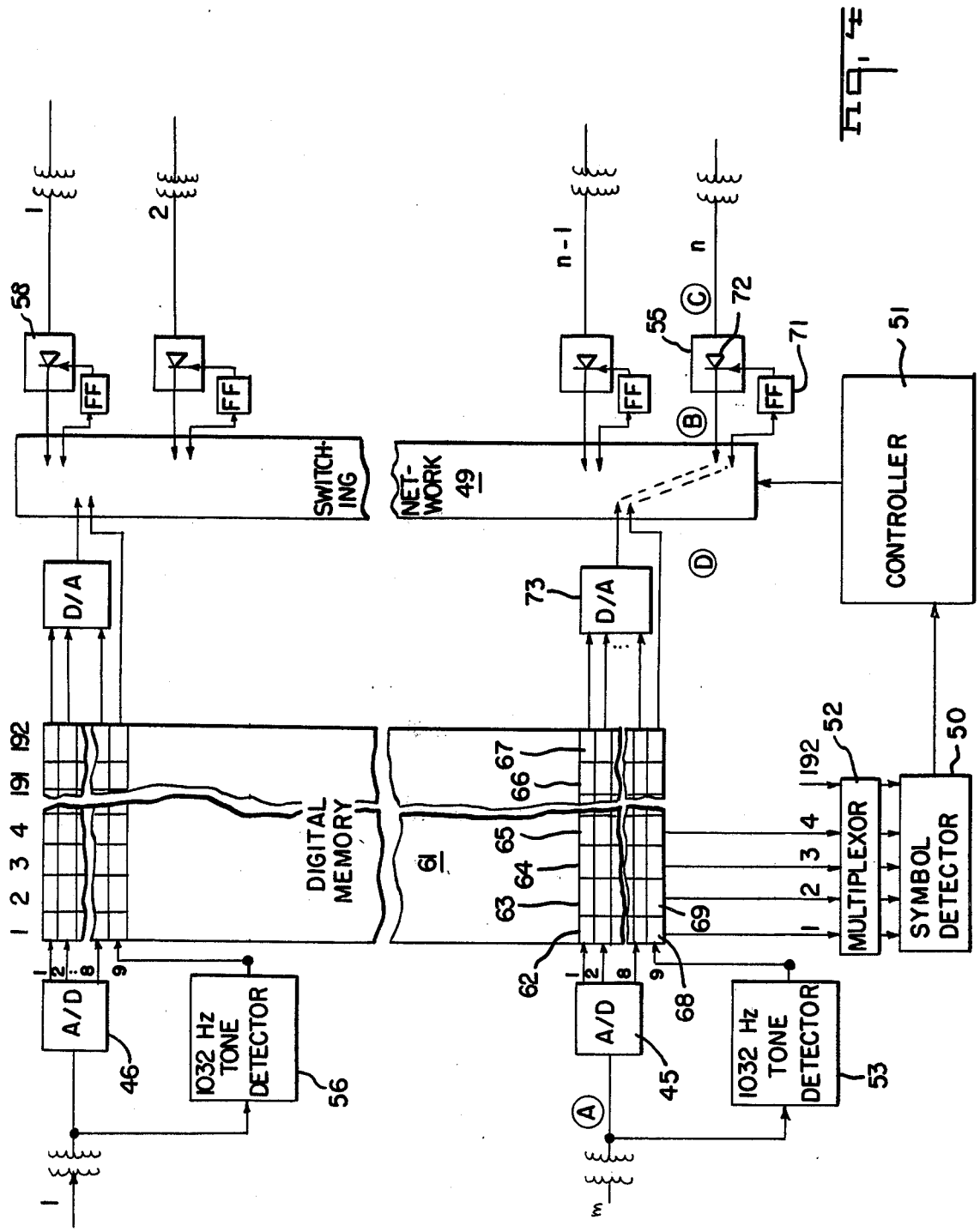

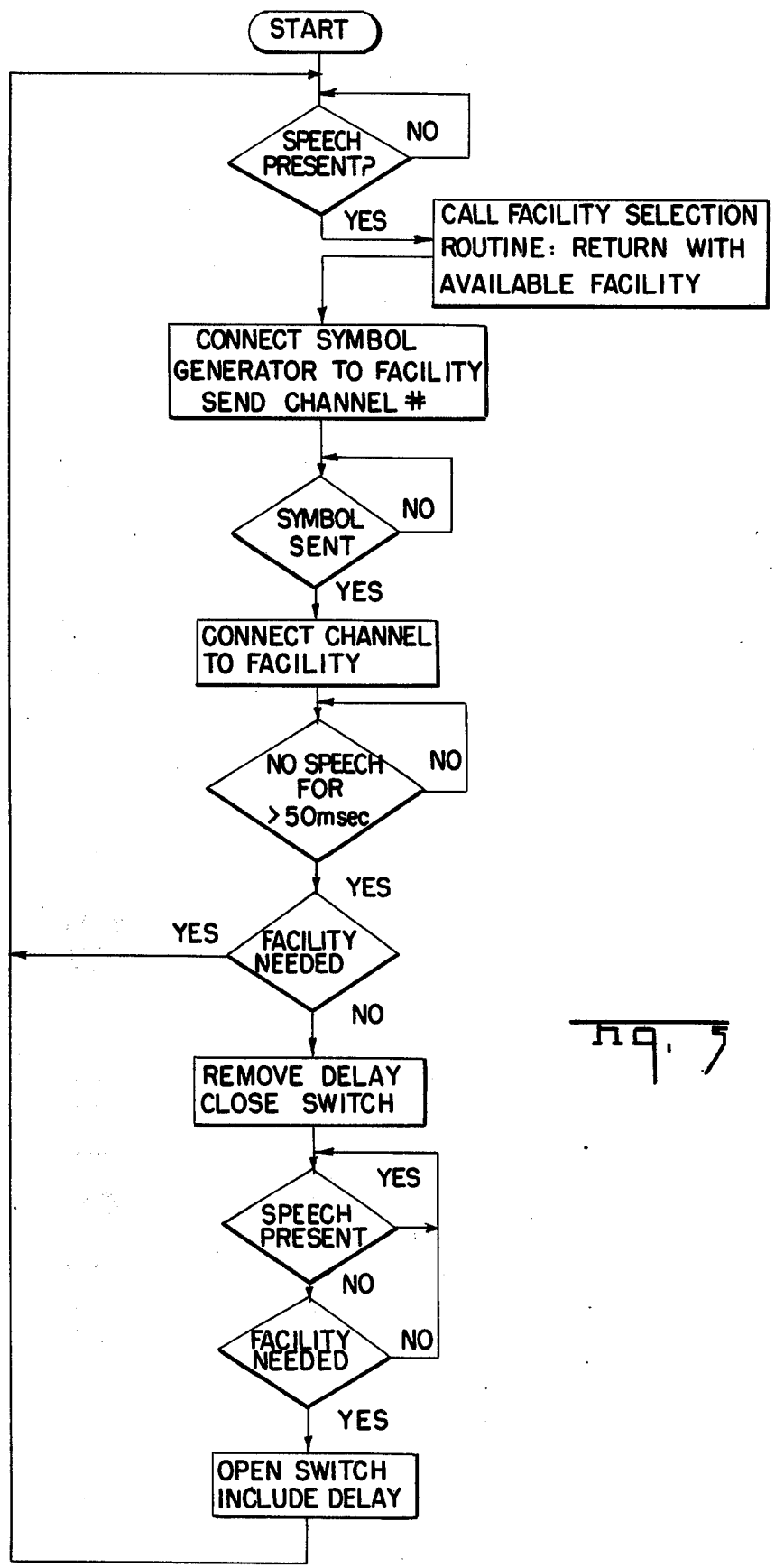

FIXED SPEECH BUFFER MEMORIES FOR SIGNALLING WITHOUT AN ORDER WIRE

BACKGROUND OF THE INVENTION

This invention relates to time assignment speech interpolation systems.

Because of the extremely high cost of communications transmission facilities, e.g. satellite channels and undersea transmission links, the prior art has sought various means to maximize the efficiency of existing transmission facilities. One such system is known as a time assignment speech interpolation (TASI) system. In a typical TASI system, calls from n callers are transmitted across, for example n/2 transmission facilities to a remote location. At that location, the n/2 facilities are connected to n output speech channels. TASI systems operate on the assumption, verified as a statistical fact, that at any given time not all callers will wish to talk simultaneously. In fact, as a general rule, callers are actively talking less than half of the time the talker and the listener are interconnected. Accordingly, TASI systems may be defined as switching systems which interconnect talker and listener only when the talker is actively speaking, provided there is a transmission facility available at that time.

"OVER-ALL CHARACTERISTICS OF A TASI SYSTEM" by J. M. Fraser, D. B. Bullock and N. G. Long, The Bell System Technical Journal, July 1962, pages 1439-1473 describes a TASI system. Such systems have been successfully used on undersea cables, for example, where a relatively large number of transmission facilities are available. Typically, thirty-six transmission facilities are available to transmit signals from seventy-four speech channels. Another transmission facility, referred to as the order wire, or control channel, is used to transmit disconnect signals to the remote location. FIG. 3 of the aforementioned article shows such a system.

It is necessary to use a separate transmission facility as an order wire in the prior art in order to disconnect an unused output speech channel from a facility at the remote location before connecting that facility to a new output speech channel. The prior art systems transmit a tone signal preceding the speech burst. This tone identifies the output speech channel to which the speech burst is to be connected. If the transmission facility is not disconnected from the old output speech channel before arrival of this tone, an unpleasant noise is applied to the old speech channel.

It is desirable to apply the principles of time assignment speech interpolation to systems in which a smaller number of transmission facilities are available. For example, it might be desirable to apply the TASI principle to private line communications systems having as few as four transmission facilities. In order to make the most efficient use of such a system, it is desirable to eliminate the order wire.

It is an object of the present invention to eliminate the order wire in a time assignment speech interpolation system.

It is a further object to eliminate the order wire without introducing the disadvantage of hearing the tone which precedes a speech burst. The present invention disconnects a speech channel from a transmission facility before the arrival of a tone identifying a new output speech channel can be heard.

RELATED APPLICATIONS

Time Assignment Speech Interpolation Communication System, William A. Morgan, Ser. No. 863,902 filed Dec. 23, 1977 describes the variable length memory for this type of system.

Digital Memory Providing Fixed and Variable Delays In A TASI System, Glen R. Clingenpeel, Ser. No. 863,903, filed Dec. 23, 1977, describes the digital memory for implementing the fixed delay of this invention, and the variable length delay of the above-identified Morgan application.

The disclosures of these applications are incorporated herein by reference.

SUMMARY OF THE INVENTION

In accordance with this invention, a fixed delay between the input speech channel and the transmission facility provides a time interval in which a symbol identifying the speech channel to which a transmission facility has been assigned is generated. This symbol is transmitted on the transmission facility before the information signal. At the remote location, a fixed delay between the transmission facility and the output speech channel provides the time interval in which to detect the symbol and perform the necessary switching without the listener hearing part of the symbol.

In accordance with another aspect of the invention, the symbol comprises a plurality of bits identifying the speech channel and a switching bit. The switching bit is detected at the remote location in order to perform switching at a uniform time corresponding with the occurrence of this switching bit.

In practicing the invention in one form thereof, the signals at the remote location are digital. These digital signals are stored in a digital memory. This provides the fixed delay between the transmission facility and the output speech channel.

In accordance with another aspect of this invention, the switching bit is stored in a bit location in the digital memory to provide a fixed time delay for the switching bit. This provides an inexpensive means for delaying the switching bit.

The foregoing and other objects, features and advantages of the invention will be better understood from the following more detailed description and appended claims.

DESCRIPTION OF THE DRAWINGS

FIG. 2 shows a block diagram of the sending side of the system;

FIGS. 2A-2C show waveforms at the points A, B and C in FIG. 2;

FIG. 3 shows a block diagram of the receiving side of the system:

FIGS. 3A-3D are waveforms showing the signals at the points A, B, C and D in FIGS. 3 and 4;

FIG. 4 shows the implementation of the delay with digital memory; and

FIG. 5 shows a flow diagram depicting the operation of the controller at the sending end of the system.

DESCRIPTION OF THE PREFERRED EMBODIMENT

Figure 1:
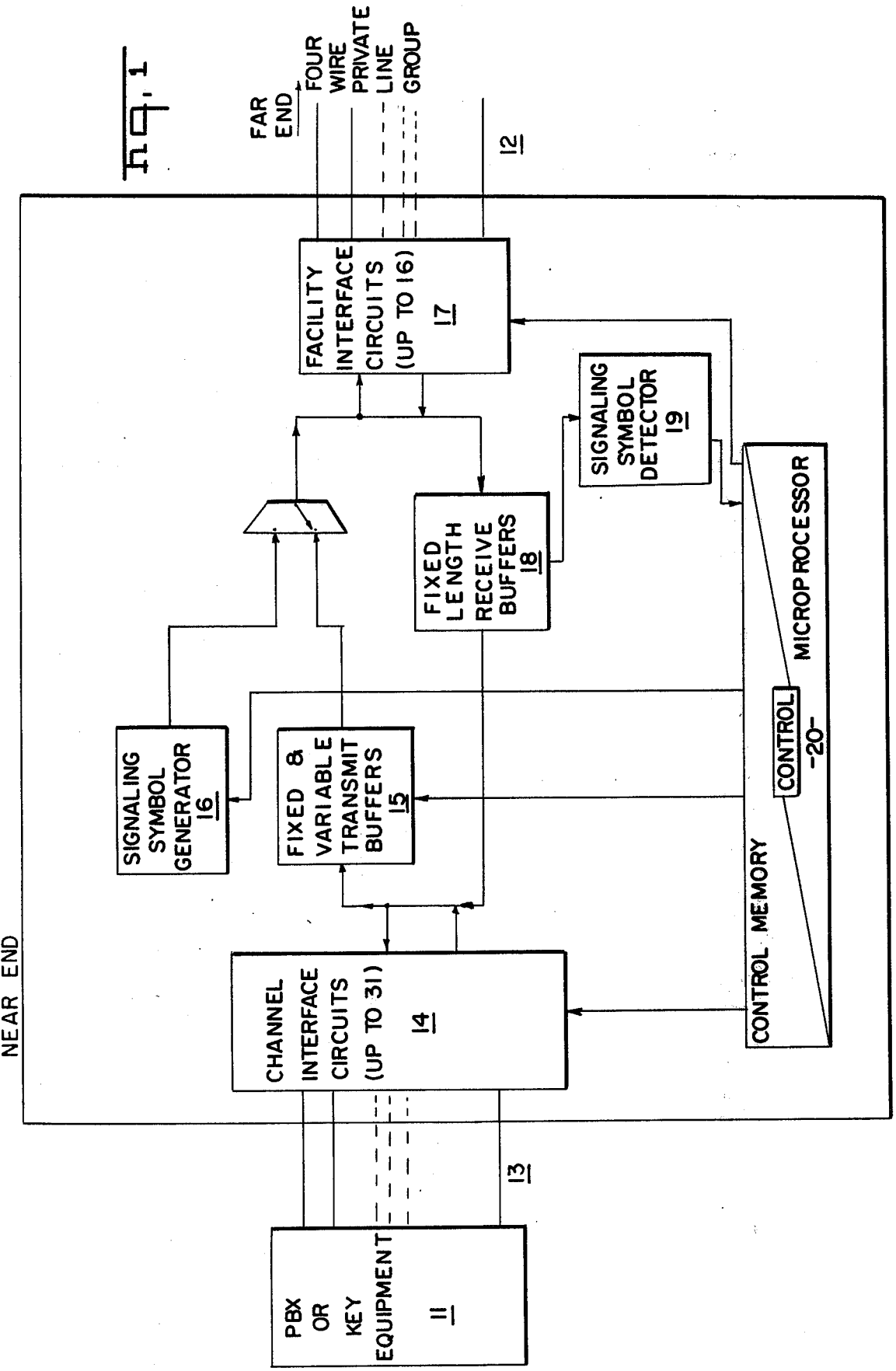
FIG. 1 shows the overall system to which the present invention is applied.

FIG. 1 is a block diagram of the overall system to which the present invention is applicable. Subscriber equipment 11, such as PBX or key equipment, is serviced by a private line communication system which includes four-wire transmission facilities 12. The subscriber equipment is connected over input channels 13 to the system of which this invention is a part. The N input channels will normally be serviced by N/2 transmission facilities. Typically, up to thirty-two input channels will be serviced by up to sixteen transmission facilities.

Channel interface circuits 14 include analog-to-digital converters and a switching network for periodically polling each of the input channels to service them in sequence. Fixed and variable transmit buffers 15 are provided. The variable buffers provide temporary storage for the sampled signals if a facility is unavailable. A symbol generator 16 generates a tone symbol which is inserted before some of the speech bursts transmitted on a facility to indicate the channel which originated that speech burst. In accordance with this invention, fixed buffer 15 provides a time interval in which to transmit the symbol without clipping the input signal.

Speech bursts are connected through interface circuits 17 to the transmission facilities 12. Interface circuits 17 include a switching network and digital-to-analog converters.

The transmission facility transmits these analog signals to a remote location sometimes referred to as the "far end."

When messages are received from the remote location, the fixed length receive buffers 18 provide a time interval in which the symbol detector 19 decodes the tone symbol to determine to which channel the message should be assigned. The assignment of channels to facilities and the time that a message may be stored in the variable speech buffer is under control of control means 20, typically a microprocessor.

Referring to FIG. 2, there are n input speech channels of which only channel 1 and channel n have been shown. As is conventional in such systems, signals from the input speech channel are applied to switching network 30 which selectively connects an input speech channel to an available transmission facility 1 . . . m. Only transmission facilities 1 and m have been shown. Typically, there are half as many transmission facilities as there are input speech channels. Speech detectors 31, 32 and others, detect the presence of a signal on an input channel. In response to the detection of a signal on the input channel, a controller 35 operates switching network 30 to connect the input speech channel to an available transmission facility. FIG. 2 shows input speech channel n connected to transmission facility m.

In accordance with the present invention, fixed delays 33, 34 and others are connected between each input speech channel and switching network 30. The delays 33 and 34 provide a time interval during which a symbol from signalling generator 36 is applied to the transmission facility. This symbol from signalling generator 36 identifies the speech channel to which the transmission facility has been assigned. For example, assume transmission facility m has been assigned to input speech channel n as shown in FIG. 2. Signalling generator 36 generates a symbol representing input channel n. This is applied to the transmission facility m before the speech signal, sometimes referred to as a speech burst. The 32 msec delay 34 provides the time interval required to insert the symbol before the speech signal.

Another important aspect of the present invention is the provision of switches 37 and 38 which are in a circuit in parallel with the fixed delay. These provide the capability of switching the fixed delay out of the sending side of the system after the first speech burst as long as a transmission facility is connected to that channel. The reduction of delay is important particularly if two or more systems are connected in tandem. In this case, the delays add together and can be objectionable during certain types of speech. However, it has been found that interposing the delay 33 and 34 only during a first speech burst when an input channel is connected to a new transmission facility is not objectionable.

Features which are shown on FIG. 2 which are not part of the present invention include capability for converting signals from the input channels into digital (P.C.M.) form by means of the analog-to-digital converters 39 and 40. These digital signals may be stored for variable times in digital buffers (not shown), and then transmitted on a facility when a facility becomes available. This is described in the aforementioned application of William A. Morgan. The digital signals are converted back to analog by the digital-to-analog converters 40a and 40b before the signals are applied to the transmission facilities.

The operation of the sending system shown in FIG. 2 is as follows. Speech detectors 31 and 32 monitor the input speech channels and apply signals to controller 35 indicating when a speech burst appears on a particular input channel. The controller 35 controls the connection of an active speech channel to an available transmission facility. Assume a speech burst appears on input speech channel n and that this channel is not presently connected to a transmission facility. The controller 35 determines that transmission facility m is available. It generates a signal which later connects the output of fixed delay 34 to transmission facility m. Then it connects the output of signalling generator 36 to transmission facility m. After the first pause between talkbursts, the controller operates switching network 30 to connect the output of switch 37 to facility m.

The manner in which controller 35 determines the availability of the transmission facility and which facility is to be disconnected and reconnected to a new speech channel can be in accordance with the prior art or the procedure which is the invention of T. B. Cannon, Ser. No. 863,890, filed Dec. 23, 1977. Controller 35 is implemented with an eight bit microprocessor, such as the Intel 8085A. A simplified flow diagram of the operation is shown in FIG. 5. The interconnection of the microprocessor will be apparent from this flow diagram.

Signalling generator 36 generates a tone signal identifying channel n. This is transmitted over transmission facility m. After the occurrence of this tone symbol, the speech burst occurs at the output of the fixed delay 34. This is applied to transmission facility m, and transmitted to the remote location. After this initial speech burst, and as long as input speech channel n is connected to transmission facility m, the switch 37 is closed. This eliminates the 32 msec delay 34.

The operation of the system of FIG. 2 is summarized in FIGS. 2A–2C which respectively show the waveforms at the points A, B and C in FIG. 2. A speech burst occurring on channel n is shown in FIG. 2A. The burst is detected by speech detector 32 which requires approximately 8 milliseconds to respond. The response of speech detector 32 is shown in FIG. 2B. This response is applied to the controller 35 which enables signalling generator 36 to generate the multiple tone symbol 41 which contains five bits of information in three of the frequencies. The five bits identify channel n as the speech channel to which the transmission facility has been assigned. An additional frequency is present in the tone symbol which carries no information but is used for switching. It is always the same frequency, 1032 Hz in this example, and it is used to control the switch at the remote location at precise times. This tone symbol appears on the transmission facility m. At the end of the 32 milliseconds delay, the tone symbol terminates. At this time, the beginning of the speech burst appears at the output of the 32 msec delay 34. The speech burst together with the preceding tone symbol is transmitted to the remote location.

Referring to FIG. 3, transmission facilities 1 and m are shown at the receiving side of the system. The transmitted tone symbol and speech burst, shown in FIG. 3A, are received on transmission facility m.

Analog-to-digital converters 45-46 convert received analog signals from a transmission facility to digital form. Fixed delays 47 and 48 are connected between each transmission facility and switching network 49. A symbol detector 50 is connected to controller 51 which operates switching network 49 to connect the transmission facility to the output speech channel indicated by the detected symbol. A multiplexer 52 polls each transmission facility at 4 msec intervals to determine the presence of tone symbols.

In the example of operation under consideration, symbol detector 50 detects the symbol for speech channel n on transmission facility m. Controller 51 connects transmission facility m to output speech channel n. The fixed delay 47 provides a time interval in which this symbol detection and switching takes place. Actual cut-through of the connection takes place at a time determined by the occurrence of the switching bit in the tone signal 41. The switching bit is a 1032 Hz tone which is detected by the tone detector 53. The detected switching bit is delayed in the fixed delay 54. At the end of this delay, all of the switching has been performed in switching network 49. At this time, another switch 55 is closed by the switching bit. By precisely timing the switching in this manner, output speech channel n will not hear any part of the tone symbol or switching noise.

Transmission facility 1 has a similar 1032 Hz tone detector 56, and a fixed delay 57 for the switching bit. Output speech channel 1 similarly has a switch 58 which is closed by a switching bit when that channel is connected to an assigned transmission facility.

Referring to FIG. 3A, at the time 59, the tone symbol has been received and detected by detector 50. Controller 51 responds to this symbol to disconnect the output speech channel previously assigned to transmission facility m and to connect output speech channel n to that transmission facility as shown by the dashed lines in the switching network 49. At the time 59 (FIG. 3A), the tone detector 53 detects a transition in the 1032 Hz switching bit. Twenty-four msec later, the switch 55 is closed. This occurs at the time 60 in FIG. 3B. At this time, the first part of the speech burst emerges from delay 47. This passes through switch 55 to the output speech channel which does not hear any of the tone symbol or noise.

FIG. 4 shows a digital implementation of the receiving side of the system. A digital memory 61 provides the means for implementing the fixed delays 47, 48, 54 and 57 of FIG. 3.

Refer first to the portion of digital memory 61 allocated to transmission facility m. The output of analog-to-digital converter 45 is an eight bit word, the first of which is inserted into the memory location 62. Successive eight bit words are stored in memory locations 63, 64, 65 . . . , 66 and 67. In the example under consideration, there are 192 successive memory locations in which the words are stored. After a sample is stored in the last memory location, the first location is read out and a new sample is stored therein. Succeeding memory locations are read out and new samples are stored therein. A delay of 24 milliseconds is incurred between storage in a memory location and subsequent read out.

In accordance with this invention, each memory location includes a ninth bit location which is used to provide the delay for the switching bit. That is, memory location 62 includes a ninth bit location 68; memory location 63 includes a ninth bit location 69 and so on. The switching bit from tone detector 53 is applied to the bit location 68 and the switching bit at succeeding times, or the lack thereof, is stored in succeeding locations. This provides a fixed 24 milliseconds delay for the switching bit. The use of bit locations in memory 61 to provide this delay is a very inexpensive way to implement the delay.

In a similar manner, other portions of digital memory 61 are allocated to the other transmission facilities to provide a fixed delay for the speech bursts and the switching bits.

The output from the ninth bit location in the memory is applied to flip-flop 71. The trailing edge of this output sets flip-flop 71 which closes the switch 55. Switch 55 includes a solid state device 72 which is rendered conductive at the switching time. Switch 55 connects a low level noise source to the output channel when it is not connected to a transmission facility. Because of this, the listener does not notice that his transmission facility is being switched.

FIG. 4 shows the manner in which the memory 61 is sequentially polled by the multiplexer 52 in order to detect tone symbols. Every 250 micro., a different section of digital memory 61 is read out to the symbol detector 50. One hundred ninety-two words are provided for symbol detection. FIG. 4 depicts these 192 words being read out in parallel through multiplexer 52 to the symbol detector 50. In actual practice, these 192 words are recirculated at a much faster rate than the words are shifted between analog-to-digital converter 45 and digital-to-analog converter 73. This has the same effect as parallel readout. Each facility is thus examined every 4 milliseconds in a system having, for example, 16 facilities.

Instead of storing succeeding samples in succeeding locations of memory as described above, it will be understood that each sample could be stored in the first location and shifted to succeeding locations in the manner of a shift register. Other modifications are within the true spirit and scope of the invention. The appended claims are intended to cover all such modifications.

What is claimed is:

1. In a communication system of the type comprising:
   first switching means for applying signals from a plurality of input speech channels to a lesser plurality of transmission facilities;
   a speech detector coupled to each input speech channel for detecting the presence of signals on that channel;

second switching means for applying signals from said transmission facilities to a plurality of output speech channels; and control means responsive to said speech detectors for controlling said first switching means to assign an input speech channel to an available transmission facility when a signal is detected on that channel, the improvement comprising:

a symbol generator actuated by said control means for generating a symbol identifying the speech channel to which the transmission facility has been assigned;

a fixed delay between each input speech channel and said first switching means, said symbol being applied to the assigned transmission facility before said signal and during the interval of said fixed delay;

a symbol detector at said remote location connected to said second switching means to enable control of the connection of the assigned transmission facility to the output speech channel indicated by the detected symbol; and a fixed delay between each transmission facility and said second switching means, said fixed delay providing a time interval in which the symbol detection and switching takes place.

2. The system recited in claim 1 wherein each symbol includes a plurality of bits identifying the speech channel and a separate switching tone, said system further comprising:

a switching tone detector at said remote location for converting the tone to a binary switching signal; and means for delaying the detected switching signal, the delayed detected switching signal being connected to said second switching means to connect the assigned transmission facility to the output speech channel indicated by said detected symbol.

3. The system recited in claim 2 wherein said signal is a digital signal and wherein said fixed delay between each transmission facility and said second switching means comprises:

a digital memory, digital samples of said signal being stored in a sequence of memory locations in said digital memory.

4. The system recited in claim 3 wherein each sample is stored in a memory location for a fixed time and read later in the same sequence in which it was stored.

5. The system recited in claim 3 wherein said memory locations each include a plurality of bit locations for words of said digital samples and at least one bit location for said switching signal, the output of said switching signal detector being applied to said last named signal location to provide a fixed delay for said switching signal.

6. The system recited in claim 1 further comprising:

a circuit connected in parallel with said fixed delay between each input speech channel and said first switching means; and means for closing said parallel circuit so that said signals are not delayed after a transmission facility has been assigned to a speech channel and the first speech pause has occurred.

7. The system recited in claim 1 wherein said symbol generator generates a plurality of tones of different frequencies to identify said speech channel and a tone of fixed frequency as said switching signal.

* * * * *